J. F. JOHNSEN.
GUIDING MEANS FOR SLEDS.
APPLICATION FILED MAR. 30, 1915.

1,276,927.

Patented Aug. 27, 1918.

Witnesses

Inventor
J. F. Johnsen.
By
Attorneys

UNITED STATES PATENT OFFICE.

JOHN F. JOHNSEN, OF CRAIG, MISSOURI.

GUIDING MEANS FOR SLEDS.

1,276,927.  Specification of Letters Patent.  Patented Aug. 27, 1918.

Application filed March 30, 1915. Serial No. 18,152.

*To all whom it may concern:*

Be it known that I, JOHN F. JOHNSEN, a citizen of the United States, residing at Craig, in the county of Holt, State of Missouri, have invented certain new and useful Improvements in Guiding Means for Sleds; and I do hereby declare the following to be a full, clear, and exact description of the invention, such as will enable others skilled in the art to which it appertains to make and use the same.

This invention relates to new and useful improvements in sleds, and is particularly directed to the provision of means associated therewith for steering and braking the same.

It is the object of the present invention to provide means associated with a sled which when actuated singly serve positively to steer the sled in a desired direction, and which when actuated simultaneously serve as an efficient brake to retard the motion of the sled.

It is further the object to provide such braking and steering means which when not in active use are associated with the sled in such manner as to form no substantial obstruction thereon, and which are further so positioned that they may be readily grasped and operated.

With the above and other objects in view, the invention resides more particularly in the novel combination, formation and arrangement of parts as more fully hereinafter described and pointed out in the appended claim.

Reference is had to the accompanying drawings, wherein similar characters of reference designate corresponding parts throughout the several views, and in which.

Referring now more particularly to the accompanying drawings, there is shown a conventional type of sled comprising the top portion 5, and the usual sides 6 depending therefrom.

Figure 1:
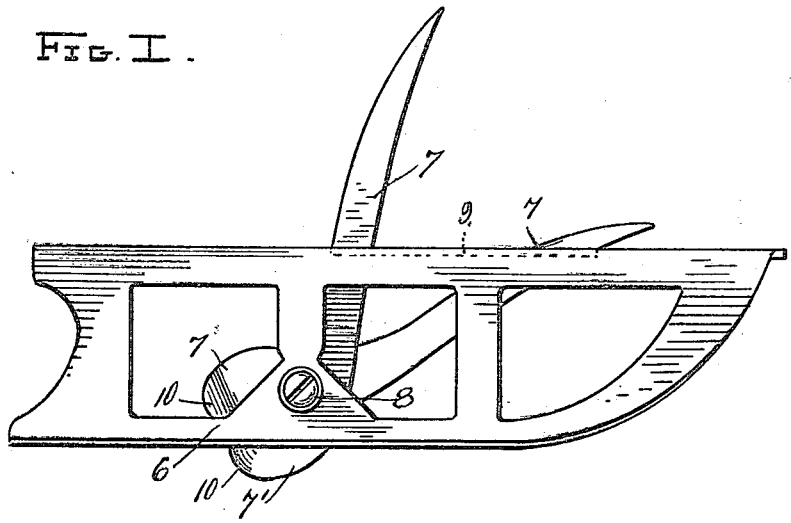
Figure 1 is a side elevation of a sled showing the improved steering and braking means associated therewith.
Figure 2:
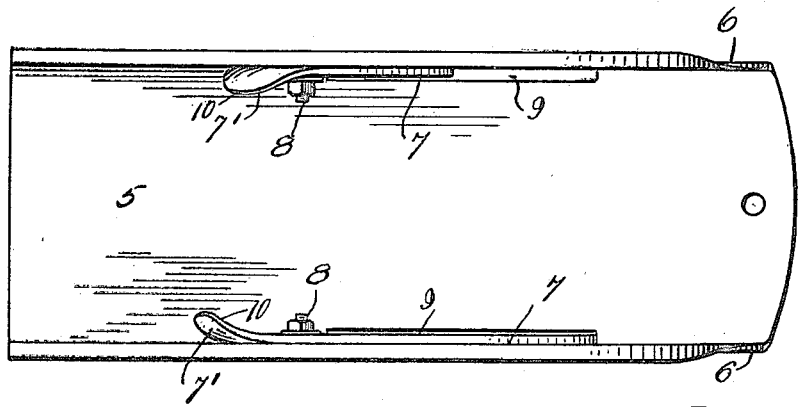
Fig. 2 is a bottom plan view of the structure shown in Fig. 1 and showing one of the brake and steering levers in retracted position, and the other in operative position.
Figure 3:
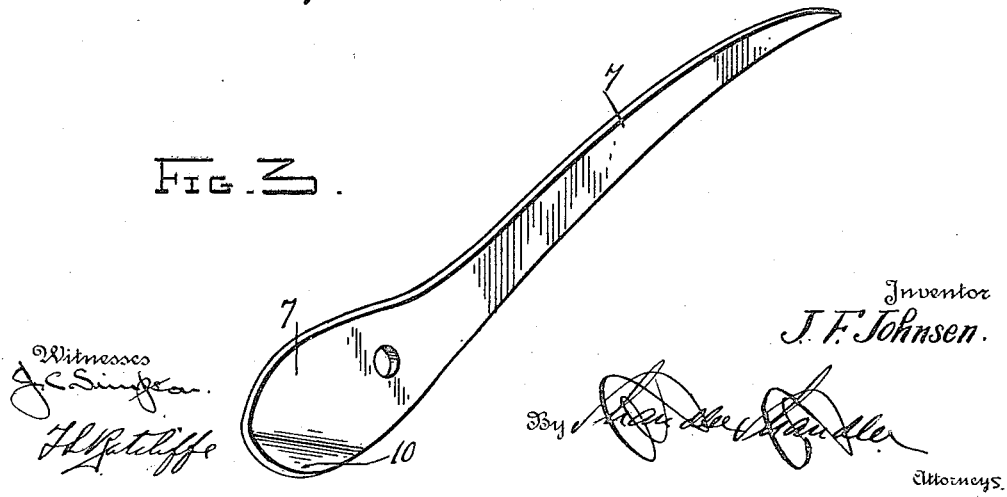
Fig. 3 is a perspective view of one of the levers.

The improved braking and steering means for this sled comprises a pair of bars 7 each having its lower end enlarged to form a ground engaging head 7' and secured to a side 6 of the sled by the pivot bolt 8. For holding the upper portions of these bars, the top of the sled is provided forwardly of the pivot bolts 8 with side slots 9 through which project the upper ends of the bars. The head portions 7' of the bars are each curved at 10 away from the adjacent side to form a more positive engagement when swung against the ground, and these curved portions have their edges disposed at an angle to the runner edge of the side as shown particularly in Fig. 2 so that when either of them is forced into engagement with the ground, a positive twisting action is procured which steers the sled much more effectively than if a simple drag action were had at the side thereof. It is readily understood that when it is desired to exert a braking action on the sled both of the head portions of the bars are engaged with the ground. There is thus provided for each of the runners 6 a pivoted lever the lower end of which is bent as shown to enter and underlie the surface on which the sled is advanced and at a rearwardly opening angle to the under face of the corresponding runner whereby to set up a plowing action to increase the friction between the runner and the traversed surface.

When the head portions are retracted the upper ends of the bars rest against the forward ends of the slot, and are thus held in position where they may be readily grasped and swung to move the head portions into engagement with the ground. The rear ends of the slots limit movement of the bars past a position wherein the head members are most effectively actuated.

From the foregoing it is observed that an exceedingly simple structure has been set up which will efficiently perform all of the functions set forth.

What is claimed is.

A steering and braking device for sleds comprising in combination with the side members of the sled, independently operable levers pivoted to said sides and having corresponding ends thereof enlarged to provide a flat peripheral head of relatively large area, the lever pivot being adjacent said head, the ground engaging tip of said head being inclined out of the plane of the major portion of the head at an acute angle with respect to the axis of the lever pivot, the major portion of said head being at right angles to said axis.

In testimony whereof, I affix my signature, in the presence of two witnesses.

JOHN F. JOHNSEN.

Witnesses:
E. HEATON,
R. C. BALL.

Copies of this patent may be obtained for five cents each, by addressing the "Commissioner of Patents, Washington, D. C."